July 12, 1949.  C. W. BERTHIEZ  2,476,255
MACHINE TOOL WITH REVOLVING TOOLHOLDER DISK
Filed Feb. 28, 1946
3 Sheets-Sheet 1

Charles William Berthiez
INVENTOR
By George W. Corey
His Attorney

July 12, 1949.　　　　C. W. BERTHIEZ　　　　2,476,255
MACHINE TOOL WITH REVOLVING TOOLHOLDER DISK
Filed Feb. 28, 1946　　　　　　　　　　　　3 Sheets-Sheet 2

Charles William Berthiez
INVENTOR
By George W. Cady
His Attorney

July 12, 1949.     C. W. BERTHIEZ     2,476,255
MACHINE TOOL WITH REVOLVING TOOLHOLDER DISK
Filed Feb. 28, 1946     3 Sheets-Sheet 3

Charles William Berthiez
INVENTOR
By George H. Carey
His Attorney

Patented July 12, 1949

2,476,255

UNITED STATES PATENT OFFICE 2,476,255

MACHINE TOOL WITH REVOLVING TOOLHOLDER DISK

Charles William Berthiez, Paris, France

Application February 28, 1946, Serial No. 651,023
In France March 20, 1945

7 Claims. (Cl. 82—24)

1

In machine tools with revolving tool holder face plates, such as e. g. boring machines with surfacing plates or tool carrying heads the operating speed of the latter as well as the possible dimensions of the tools proper and of their holders are restricted, due to the existing defective balance of the plate, this defect growing worse proportionally to the increase in speed because of the centrifugal force due to the feed motion of the tool.

This drawback of defective balance therefore does not allow utilization of large tools and, consequently, working of very large parts, and it furthermore is a bar to a high speed of rotation of the plate or head, a speed that, otherwise, might be adopted in certain cases, such as e. g. for the machining of light alloys.

The invention has for its object a device permitting of overcoming this defective balance so as to offer a properly balanced plate or disc or head in whatever position the tool may be carried on it.

To this end, according to the essential characteristic of the invention, a carriage which is symmetrical to the tool holder carriage, is mounted on the revolving plate, said carriage holding either a second tool or a counterweight and both carriages being simultaneously controlled by the same feed motion device.

These objects are attained by the mechanism illustrated in the accompanying drawing in which similar numerals refer to similar parts throughout the several views and in which.

Figure 1:
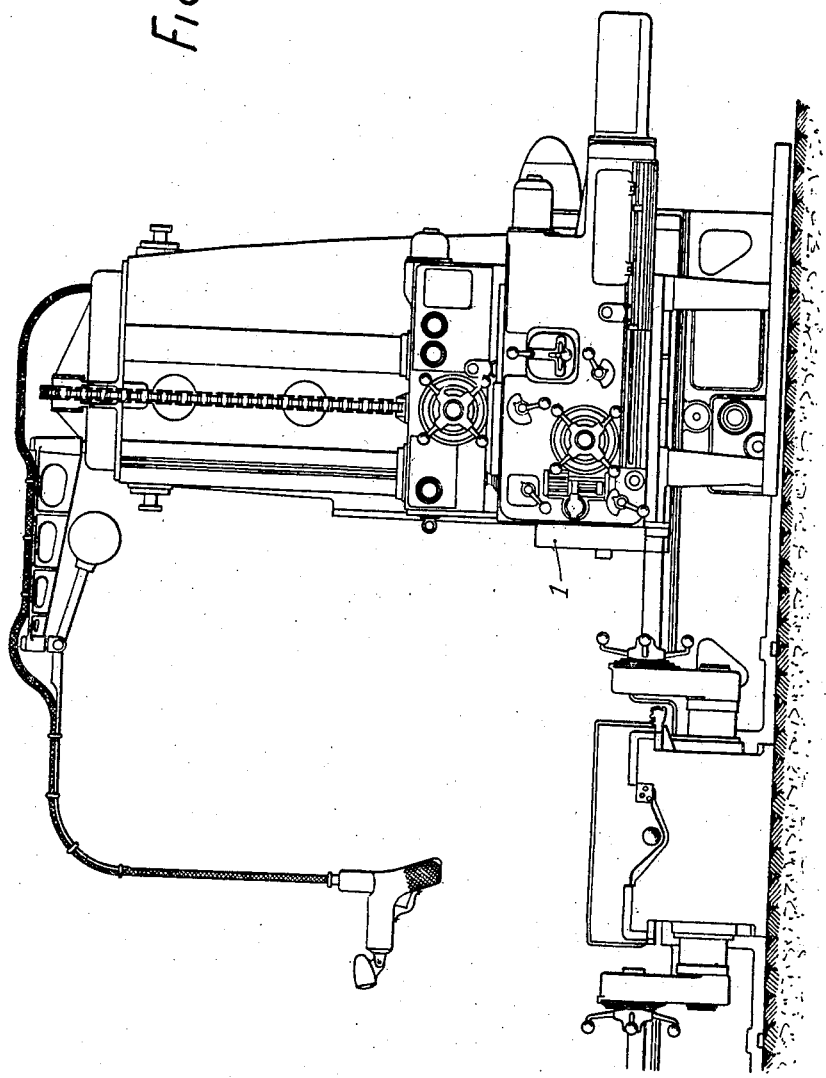
Fig. 1 is a front elevation of a part of a boring machine to which the invention may be applied.

Other characteristics and advantages of the invention will be described hereafter in connection with the drawing.

Figure 4:
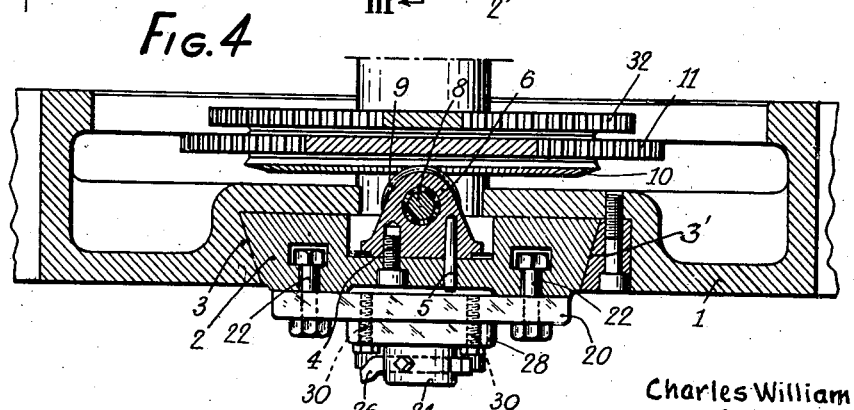
Fig. 4 is a section on line IV—IV, Fig. 2.

As will be seen in the drawing, the revolving plate or head I of the machine (that may for example be the surfacing plate of a boring machine) comprises two sliding carriages 2 and 2' (see Figs. 2 and 3) that may move in a perfectly symmetrical manner along the slideways 3 and 3' carried by the surfacing plate or forming part thereof (Fig. 4).

One of these carriages bears the tool fastened thereto in any appropriate manner while the other carriage bears either another tool or a counterweight the weight of which is equal to

2 that of the tool borne by the first carriage thereby balancing as perfectly as possible the plate about its axis of rotation. In the case where the second carriage bears a second tool and not a counterweight, this second tool may, for example, be a finishing tool, while the first one may be a roughing tool.

Whatever disposition may be resorted to, the two carriages 2 and 2' are driven synchronously and symmetrically by means of a common feed system so as to keep the balance of the plate.

Figure 2:
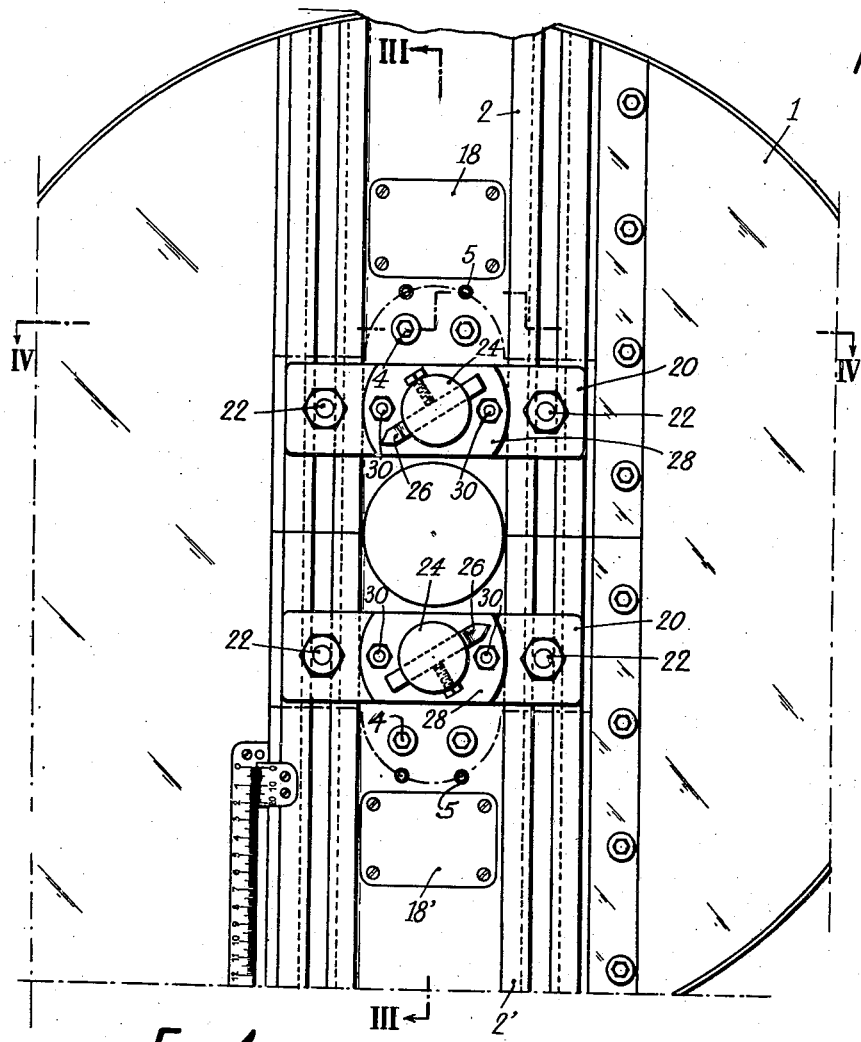
Fig. 2 is a front elevation, on an enlarged scale, of the surfacing plate or head of said boring machine according to the invention.
Figure 3:
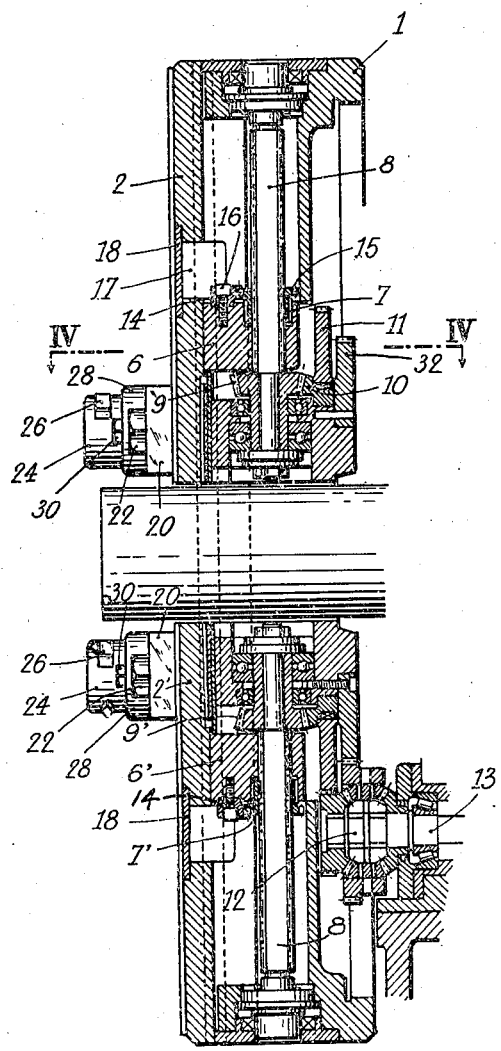
Fig. 3 is a section on line III—III of Fig. 2.

To this end, each carriage is united in any suitable manner, as by means of screws 4 or dowel pins 5 (see Figs. 2 and 4), with a part 6, 6' which itself is firmly connected to a nut 7, 7' adapted to move along a leadscrew 8, 8' (see Fig. 3). The latter, the ends of which may be mounted in suitable ball or roller bearings, is itself rotatably driven by a bevel gear 9, 9' keyed to the shaft of the screw. The bevel gears 9 and 9', corresponding to the two carriages 2 and 2', are driven synchronously by a common ring bevel gear wheel 10 forming part of a spur gear 11. The latter is driven in any suitable way by the feed motion device. In the embodiment shown in Fig. 3 the gear 11 is driven by a differential gear 12 controlled by the feed motion shaft 13, this differential gear permitting, as explained in my copending United States application Serial No. 620,605, filed October 5, 1945, now abandoned, of rendering the feed motion of the tool (and, in the present case, the feed motion of both tools or of the tool and the counterweight) independent of the speed of the surfacing plate or head. The revolving head I is driven from the differential drive by the gear 32 fastened to the head I as shown in Figs. 3 and 4.

Balancing is made once for all by regulating the initial positions of the carriages 2 and 2' in relation to the nuts 6 and 6', in which positions they are securely fixed by the dowel pins 5 (Fig. 4).

The nuts for the displacement of the carriages 2 and 2' include a device for taking up the back lash.

To this end the nut 2 or 2' comprises two elements 6 and 7 or 6' and 7'.

The elements 7 and 7' may be moved axially in regard of 6 and 6' by means of an outer thread. They are held in the position corresponding to the taking up of the back lash by an element 14 part of which is adapted of engaging notches formed on a flange 15 of said nut. The element 14 is interchangeably connected to the part 6 by a screw 16 and accessible through an opening 17 provided in the carriage and normally closed by plate 18.

This back lash adjustment device is described but accessorily, it being understood that its omission or the utilization of any suitable device for taking up the back lash would in no way modify the scope of the present invention.

The carriages 2 and 2' are of course provided with the usual T grooves necessary for securing the tools thereon (or, optionally, the counterweight if such counterweight be adapted on the second carriage 2' instead of the second equilibration tool). For this purpose the heads of bolts 22 are inserted in the T grooves for fastening the bars 20 to the respective carriages so as to be disposed at opposite sides of the axis of the head 1 as shown in Figs. 2 and 3 and to be movable with these carriages. The tool holders 24 carry the tools 26 and are formed with flanges 28 which are fastened by tap screws 30 to the respective bars 20. The bars, tool holders and fasteners respectively carried by the carriages 2, 2' may be of like form and weight and may be positioned symmetrically with respect to the carriages 2, 2' and with respect to the axis of the head 1 so as to provide for the balancing about this axis as above referred to.

Due to the balancing of the surfacing plate or disc thus attained according to the invention, which balancing is automatically maintained while the tool is advancing, it is possible on one hand to make use of larger tools, thus allowing machining of large parts and, on the other hand, to have the surfacing plate rotate at high speed, this more particularly for the machining of light alloys thereby materially increasing the output of the machine.

It is to be understood that the device described hereabove and illustrated in the accompanying drawing is merely given by way of example and that certain details in carrying same into effect might be modified without impairing the general scope of the invention. Thus, more particularly, the feed motion device of the tool might be carried out in a different manner from that indicated.

It is furthermore to be understood that, although shown, by way of example, in connection with a surfacing plate of a boring machine, the invention is not limited to this application but may likewise be carried with effect in connection with any revolving plate being part of any machine tool whatsoever.

What is claimed is:

1. A tool carrying head for a machine tool or the like which comprises a member revolvable upon an axis for carrying a tool holder or the like, a plurality of slideways extending in said member outwardly with respect to the axis of revolution of said member and in symmetric relation to each other about said axis, carriages respectively carried in said slideways in balanced relation to each other for movement thereof outwardly and inwardly along respective slideways, means positioned outwardly of said axis to leave clear a central space concentric therewith and operatively connecting symmetrically related carriages for effecting simultaneous movement of said carriages in opposite directions along the respective slideways symmetrically with respect to said axis, said means comprising a rotatable element associated with each carriage supported by said revolvable member to revolve therewith and for rotation on an axis intersecting said axis of said revolvable member and parallel to and symmetrically positioned with respect to the respective slideways, and a rotatable kinematic element supported by said revolvable member for rotation on said axis of said revolvable member and symmetrically formed with respect thereto, said kinematic element being operatively connected to said rotatable elements in symmetrically positioned carriages for effecting said simultaneous movement of said carriages symmetrically with respect to said axis of said revolvable member.

2. A tool carrying head for a machine tool or the like comprising a member revolvable upon an axis for carrying a tool holder or the like, a plurality of slideways extending in said member outwardly with respect to the axis of revolution of said member and in symmetric relation to each other about said axis, carriages respectively carried in said slideways in balanced relation to each other for movement thereof outwardly and inwardly along respective slideways, means positioned outwardly of said axis to leave clear a central space concentric therewith and operatively connecting symmetrically related carriages for effecting simultaneous movement of said carriages in opposite directions along the respective slideways symmetrically with respect to said axis, said means comprising a rotatable element associated with each carriage supported by said revolvable member to revolve therewith and for rotation on an axis intersecting said axis of said revolvable member and parallel to and symmetrically positioned with respect to the respective slideways, and a rotatable kinematic element supported by said revolvable member for rotation on said axis of said revolvable member and symmetrically formed with respect thereto, said kinematic element being operatively connected to said rotatable elements in symmetrically positioned carriages for effecting said simultaneous movement of said carriages symmetrically with respect to said axis of said revolvable member, and means operatively connected to said connecting means and operable during revolution of said revolvable member for effecting said simultaneous and symmetrical movement of said carriages along said slideways.

3. A tool carrying head for a machine tool or the like as defined in claim 1 in which the revolvable member and the parts carried thereby which are in fixed relation thereto are in balanced relation about the axis of revolution and in which the weight of the carriages and the parts carried thereby and movable therewith along the slideways are substantially equal.

4. A tool carrying head for a machine tool or the like as defined in claim 1 which comprises a tool, means carried by one of said carriages and supporting said tool thereon, and a counterweight mounted on the carriage symmetrically positioned in relation to said first carriage, said counterweight being of a weight effective to balance the weight of the tool and said means for supporting the tool on said first carriage.

5. A tool carrying head for a machine tool or the like as defined in claim 1 which comprises a tool associated with each of two symmetrically positioned carriages, and means for supporting said tools on the respective carriages, said tool and said supporting means and the respective carriages respectively providing symmetrically disposed masses of substantially equal weight.

6. A tool carrying head for a machine tool or the like comprising a member revolvable upon an axis for carrying a tool holder or the like, a plurality of pairs of slideways, the slideways of each pair extending in said member parallel to each other at opposite sides of and symmetrically offset with respect to said axis of revolution of said member, said pairs of slideways being symmetrically angularly spaced about said axis and being formed with their lengths symmetrical in each pair and symmetrical relative to said axis, carriages each adapted to support a tool and respectively carried in said pairs of slideways for movement thereof outwardly and inwardly along the respective pairs of slideways, said carriages being of symmetrical form with respect to said slideways and said axis, a plurality of carriage moving means respectively associated with said slideways and the carriages carried thereby and positioned outwardly of said axis to leave clear a central space concentric therewith, said means being respectively operatively connected to said carriages for effecting movement thereof outwardly and inwardly along the respective slideways with respect to said axis, said means being formed and positioned to be symmetrical with respect to the respective slideways and with respect to said axis, said means respectively having a rotatable element supported by said revolvable member to revolve therewith and for rotation on an axis extending parallel to the respective slideways and intersecting the axis of said revolvable member, and kinematic means symmetrically formed with respect to said axis of said revolvable member and operatively connected to said elements in symmetrically positioned carriage moving means for effecting movement of said carriages in symmetrically positioned slideways simultaneously and symmetrically inwardly and outwardly of said axis.

7. A tool carrying head for a machine tool or the like as defined in claim 6 which comprises means operatively connected to said kinematic means and operable during revolution of said revolvable member for effecting said simultaneous and symmetrical movement of said carriages along said slideways.

CHARLES WILLIAM BERTHIEZ.

REFERENCES CITED

The following references are of record in the file of this patent:

UNITED STATES PATENTS

| Number | Name | Date |
|---|---|---|
| 632,230 | Berger | Sept. 5, 1899 |
| 1,713,892 | Dorin | May 21, 1929 |

Certificate of Correction

July 12, 1949

Patent No. 2,476,255    CHARLES WILLIAM BERTHIEZ

It is hereby certified that errors appear in the above numbered patent requiring correction as follows:

In the grant, line 6, for title of invention, "MACHINE TOOLS WITH REVOLVING TOOLHOLDER DISKS" read *MACHINE TOOLS WITH REVOLVING SURFACING PLATES*; in the heading to the drawings, sheets 1, 2, and 3, and in the heading to the printed specification, for "MACHINE TOOL WITH REVOLVING TOOLHOLDER DISK" read *MACHINE TOOL WITH REVOLVING SURFACING PLATE*; column 2, line 34, after the words "speed of" insert *rotation of*; and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*